UNITED STATES PATENT OFFICE.

DAVID S. PRATT AND CHARLES W. TRIGG, OF PITTSBURGH, PENNSYLVANIA, ASSIGNORS TO JOHN E. KING, OF DETROIT, MICHIGAN.

METHOD OF MAKING WATER-SOLUBLE COFFEE EXTRACT AND THE PRODUCT.

1,367,715.      Specification of Letters Patent.      Patented Feb. 8, 1921.

No Drawing.      Application filed May 31, 1918. Serial No. 237,568.

*To all whom it may concern:*

Be it known that we, DAVID S. PRATT and CHARLES W. TRIGG, citizens of the United States, residing at Pittsburgh, in the county of Allegheny and State of Pennsylvania, have invented a new and useful Improvement in Methods of Making Water-Soluble Coffee Extract and the Product, of which the following is a specification.

This discovery relates to the manufacture of water-soluble coffee-extract. It has for its object the preparation of a water-soluble coffee-extract, preferably in tablet form, which is provided with an aroma-retaining ingredient. This aroma-retaining ingredient is of a character to admirably accomplish this purpose without any other objectionable results.

We have discovered that carbohydrates have a peculiar affinity for the aromas or caffeol of coffee. This action we assume to be due to the formation of relatively unstable molecular compounds by the substances that go to make up the aroma or caffeol, such as catechols, pyrrols, pyridin, acrolein, furfural, etc., combinations and polymers of the same, with the carbohydrates. These carbohydrates combined with the constituents of the caffeol will thus retain the caffeol for a relatively long period of time.

It has been proposed to use sucrose for catching fleeing caffeol, but we have found this substance ill-adapted for manufacturing a water-soluble coffee-extract for several reasons. In the first place, it has an objectionable sweetness which, of course, imparts to the coffee decoction made from the extract a certain definite sweetness that cannot be eliminated and which may be greater than that desired by one using the coffee-extract. Secondly, this sweetness of sucrose has a tendency to mask the more subtle flavor that would otherwise be imparted to the coffee infusion by the caffeol or aroma. The third objection to the sucrose as a caffeol retainer is that it gives the final extract a sticky tendency, especially is this objectionable when the extract is marketed in tablet form as it has a tendency to prevent the rapid disintegration of the tablet when dropped into the water for dissolution.

Our discovery consists in recognizing the adaptability of carbohydrates having the tastelessness and non-sticky properties of lactose as caffeol catchers and retainers, and the discovery of this class of carbohydrates which is calculated not only to retain the caffeol but be practically neutral so far as the effect is concerned on the coffee infusion made from the extract. We have found that lactose or milk sugar is a very efficient agent in catching and retaining caffeol while at the same time it leaves no perceptible taste in the coffee infusion made from the extract. Furthermore, it can be very easily and finely powdered and mixed with the coffee-extract. The aroma or caffeol can be brought in contact with this mixture in any way which is deemed desirable, such for instance, as in its gaseous state escaping from the roaster or the grinder, or when it is in solution in a volatile solvent. The lactose takes up the aroma and gives a highly aromatic and pleasantly flavored extract.

Of course the lactose could be used alone to absorb the caffeol and then later added to the coffee-extract, or the lactose might be dissolved in a solution containing caffeol and the solution then evaporated to dryness. The exact way that the caffeol is brought into contact with the lactose is not material in the broad sense of our discovery.

Lactose is a carbohydrate which possesses aroma-retaining powers, which leave scarcely any taste in the coffee infusion prepared from the extract, and which do not possess the objectionable stickiness of sucrose.

What we claim is:

1. In a process for preparing a water-soluble coffee-extract, the steps which consist in separating the aroma from a coffee infusion and the bringing of the aroma into contact with lactose to allow the lactose to absorb the aroma.

2. In a process for preparing a water-soluble coffee-extract, the step which consists in bringing coffee aroma into contact with lactose and allowing the lactose to absorb the aroma.

3. A coffee-extract, comprising the dry coffee concentrate in which is contained lactose impregnated with caffeol or aroma.

4. In a process for preparing water-soluble coffee-extract, the bringing of coffee aroma into contact with lactose and allowing the lactose to absorb the aroma, and the adding of the lactose with the absorbed aroma to a previously prepared coffee-extract.

5. In a process for preparing water-soluble coffee-extract, the combination which consists in passing coffee aroma in a gaseous state into contact with lactose and allowing the lactose to absorb the said aroma.

In witness whereof we have hereunto set our hands on the 24th day of May, 1918.

DAVID S. PRATT.
CHARLES W. TRIGG.